United States Patent [19]

Usher et al.

[11] Patent Number: 4,549,741
[45] Date of Patent: Oct. 29, 1985

[54] COMBINATION METAL AND KNITTED WIRE MESH GASKET

[75] Inventors: Peter P. Usher, Union; Eugene J. Gavaletz, Toms River, both of N.J.

[73] Assignee: Metex Corporation, Edison, N.J.

[21] Appl. No.: 616,972

[22] Filed: Jun. 4, 1984

[51] Int. Cl.⁴ .............................. F16J 15/02
[52] U.S. Cl. ........................... 277/236; 277/206 R
[58] Field of Search ................ 277/236, 206, 206.1

[56] References Cited

U.S. PATENT DOCUMENTS

| 2,484,693 | 10/1949 | De Witt et al. | 288/10 |
| 3,341,211 | 9/1967 | Houghton et al. | 277/205 |
| 3,519,281 | 7/1970 | Teucher et al. | 277/206 |
| 3,532,349 | 10/1970 | Czernik | 277/206 |
| 3,588,131 | 6/1971 | Nicholson | 277/206 |
| 3,680,874 | 8/1972 | Schwarz | 277/153 |
| 3,722,898 | 3/1973 | Benningsen | 277/206 |
| 3,738,558 | 6/1973 | Colwell | 277/235 |
| 3,869,132 | 3/1975 | Taylor et al. | 277/26 |
| 3,909,019 | 9/1975 | Leko | 277/209 |
| 4,114,907 | 9/1978 | Abbes | 277/236 |
| 4,121,846 | 10/1978 | Skrycki | 277/235 |
| 4,133,542 | 1/1979 | Janiah | 277/152 |
| 4,173,129 | 11/1979 | Durham | 277/206 R |
| 4,175,754 | 11/1979 | Wilhelm | 277/206 R |
| 4,214,763 | 7/1980 | Latham | 277/236 |
| 4,369,980 | 1/1983 | Backlin | 277/236 |
| 4,371,175 | 2/1983 | Van Dyk | 277/236 |

Primary Examiner—Robert I. Smith
Attorney, Agent, or Firm—Amster Rothstein & Engelberg

[57] ABSTRACT

A combination metal and knitted wire mesh gasket includes a gasket body formed of metal and having interconnected first and second portions. A layer of knitted wire mesh having a recess extending along the internal circumference of a first surface thereof receives the first portion of the metal gasket body. The second surface of the knitted wire mesh engages the second portion of the metal gasket body such that the first portion of the metal gasket body and the first surface of the knitted wire mesh form the first surface of the gasket. The second surface of the gasket is formed by the second portion of the metal gasket body.

6 Claims, 6 Drawing Figures

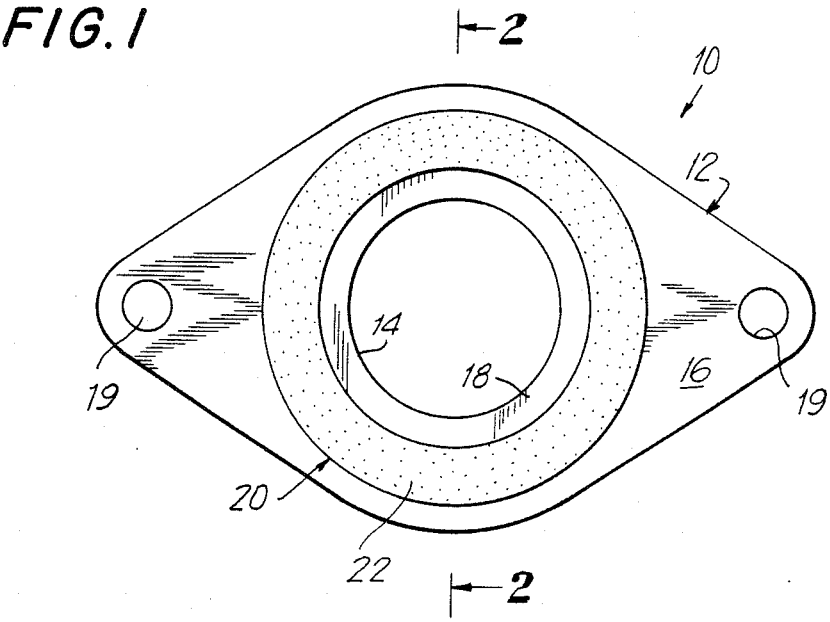
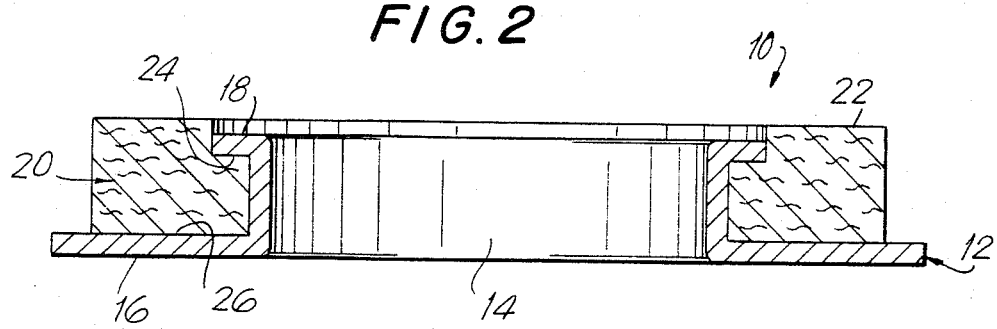
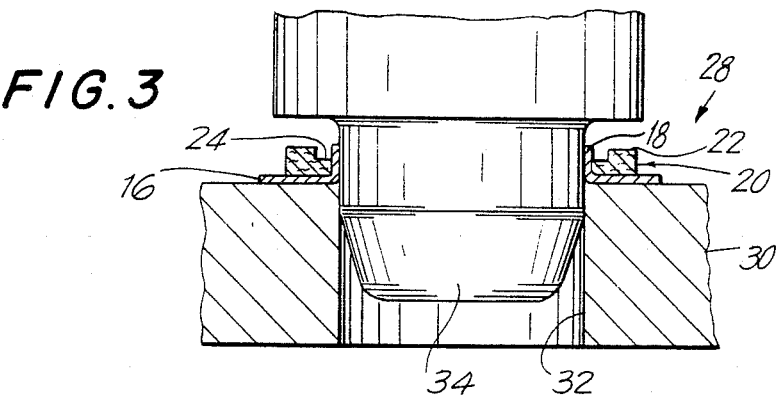

COMBINATION METAL AND KNITTED WIRE MESH GASKET

DESCRIPTION OF THE INVENTION

This invention relates to gaskets and more particularly to a combination metal and knitted wire mesh gasket for use in sealing gas passages particularly in systems exposed to extreme temperature changes.

At various locations in automotive exhaust systems, bolted joints are used to connect such devices as catalytic converters, mufflers, and resonators to the exhaust pipe and for joining together sections of the pipe. This type of joint usually consists of two flanged surfaces drawn together by means of two bolts assembled through holes provided in the flanges. A gasket usually consisting of a refractory material such as asbestos is generally installed between the flanges to prevent leakage of the high temperature exhaust gases. The gasket is intended to prevent exhaust gas from leaking through the joint while, at the same time, resist deterioration from the high temperature and the corrosive action of the gas. Furthermore, it must be sufficiently resilient and compliant to withstand repetitive thermal cycling through sub-freezing winter temperatures up to operating temperatures in excess of 1500 degrees Farenheit (i.e. in automobiles with catalytic converters). Without such resilient compliance, a gasket would develop leakage paths and would soon be destroyed by the corrosive action of the hot exhaust gas.

Because of environmental controls being imposed on the use of asbestos containing parts in automobiles, and because of noise transmission problems in exhaust systems, there is need for a high temperature flange gasket that does not contain asbestos and which is intrinsically resilient, so as to provide vibration damping characteristics. Currently, in the automobile industry, established gasket constructions are not providing adequate performance because of their intolerance to the warping and movement of the adjoining members between which the gasket is clamped. Such problems are prevalent with the new lightweight exhaust manifolds fabricated from stainless steel sheet metal. These manifolds are more sensitive to thermal stresses than the old designs which consisted of heavyweight cast iron castings. Conventional gaskets fabricated from sheet metal or non-metallic materials quite often do not have sufficient compliance to maintain an effective seal between the engine exhaust ports and a sheet metal manifold resulting in exhaust gas leakage. Excessive leakage can cause damage to other engine components and create a hazardous condition for the automobile occupants.

In addition, other high pressure/high temperature industrial processes often have valves, pipe flanges, and various equipment access members sealed with commercially available gasketing. Many of these gasketings are "mill-board" or "sheet-packing" products which may be composed of mineral fibers, fiberglass, ceramic fibers, organic fibers and various inorganic or rubber-like binders blended in varying formulations and pressed into uniform thickness sheets. The resiliency of this type of gasketing is quite often very minimal. Further, this type of gasketing is subject to physical degradation in sustained high temperature exposure.

Still other technologies experiencing difficulty with gaskets include cryogenic technology since gaskets formed from plastics, resins, rubber binders and flexible organic materials are likely to be frozen rigid at cryogenic temperatures and therefore be rendered useless. Furthermore, the severe contraction and phase changes that take place in many materials at super-cold temperatures can cause them to crack, disintegrate, or be destroyed upon excursions into the cryogenic region.

Accordingly it is an object of the present invention to provide a combination metal and knitted wire mesh gasket for use in systems exposed to extreme temperature changes.

Another object of the present invention is to provide a combination metal and knitted wire mesh gasket which has a high degree of structural integrity and is resistant to the effects of thermal corrosion and erosion.

Still another object of the present invention is to provide a combination metal and knitted wire mesh gasket having sufficient resiliency to cope with flange movement due to thermal expansion or contraction.

A further object of the present invention is to provide a combination metal and knitted wire mesh gasket capable of use with extremely high clamping loads to achieve excellent sealability.

A still further object of the present invention is to provide a combination metal and knitted wire mesh gasket which will tend to diffuse any leakage and prevent damage caused by high pressure jets and erosion failure.

In accordance with one embodiment of the present invention a gasket includes a gasket body formed of metal and having interconnected first and second portions. A layer of knitted wire mesh having a recess extending along the internal circumference of a first surface thereof receives the first portion of the metal gasket body. The second surface of the knitted wire mesh engages the second portion of the metal gasket body such that the first portion of the metal gasket body and the first surface of the knitted wire mesh form the first surface of the gasket. The second surface of the gasket is formed by the second porion of the metal gasket body. These and other objects and features of the invention will be more readily understood when taken in conjunction with the following detailed description of the invention and the following drawings, of which:

FIG. 1 is a top plan view of the combination metal and knitted wire mesh gasket of the present invention;

FIG. 2 is a sectional view of the combination gasket shown in FIG. 1 taken along the lines 2—2 of FIG. 1;

FIG. 3 is a sectional view of the gasket body and knitted wire mesh ring together with apparatus for forming the combination gasket shown in FIGS. 1 and 2;

Figure 5:
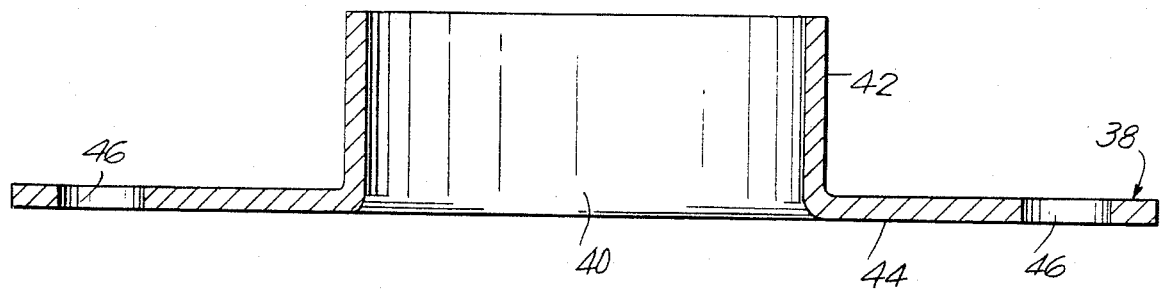
FIGS. 5 and 6 are sectional views of the gasket body and knitted wire mesh ring showing their use in the formation of the combination gasket shown in FIG. 4.

Referring now to FIGS. 1 and 2, the combination metal and knitted wire mesh gasket of the present invention is indicated generally by the reference numeral 10. The specific dimensions given in connection with the combination gasket 10 are chosen for use of the gasket in an automotive exhaust system and can be changed as necessary in order to adjust the dimensions of the combination gasket to other installations. Combination gasket 10 includes a gasket body 12 having a circular shaped opening 14 extending therethrough. The gasket body 12 is formed with interconnected first and second portions 16 and 18. Second portion 18 is formed with bolt receiving cut-outs 19.

An annular ring of knitted wire mesh 20 is disposed between the first and second portions 16 and 18. The first surface 22 of the knitted wire mesh ring 20 is formed with a recess 24 extending along the internal circumference thereof. Recess 24 is adapted to receive the first portion 16 of gasket body 12, such that the first surface of the gasket is formed by the first portion 16 and the first surface 22 of the knitted wire mesh ring 20. The second surface 26 of the knitted wire mesh ring engages the second portion 18 of the gasket body 12, which second portion 18 forms the second surface of the gasket 10.

The recess 14 is adapted to receive the first portion 16 of the gasket body 12 such that the upper most surface of the first portion 16 is below the first surface 22 of the knitted wire mesh ring 20. The preferred projection of the first surface 22 beyond the upper most surface of the first portion 16 is within the range of 0.005 to 0.015 inches. The preferred overall thickness of the combination gasket 10 is within the ranges of 0.05 to 0.15 inches. Of course, values outside the preferred range may be utilized for particular applications.

The gasket body 12 is formed from any suitable metallic material. For high temperature applications, however, stainless steel such as type 304, 309 or 316 is appropriate to resist thermal corrosion. The preferred thickness of the material forming the gasket body 32 is typically in the range of 0.003 to 0.020 inches.

The knitted wire mesh forming the ring 20 may be made of round wire and various diameters and materials can be used. However, it is preferred that 0.0045 inch diameter flattened wire be used although both smaller and larger diameters can be used. The preferred density of the knitted wire mesh is in the range of 35% to 45% metal (approximately 65% to 55% free volume). However, densities above and below the preferred range can be used to achieve varying resiliencies and sealing effects.

FIG. 3 shows a tool for forming the combination gasket shown in FIGS. 1 and 2. The tool, indicated generally by the reference character 28, includes a base 30 formed with a cylindrical opening or die cavity 32 in the center thereof, and a die punch 34. The base 30 receives the second portion 18 of gasket body 12. Initially, the first portion 16 of the gasket body 12 is perpendicular to the second portion 18. The knitted wire mesh ring 20 is then placed around the first portion 16 and against the second portion 18. The die punch 34 is then lowered, bending the first portion 16 of the gasket body 12 into the recess 24 formed in the first surface 22 of the knitted wire mesh ring 20.

Figure 4:
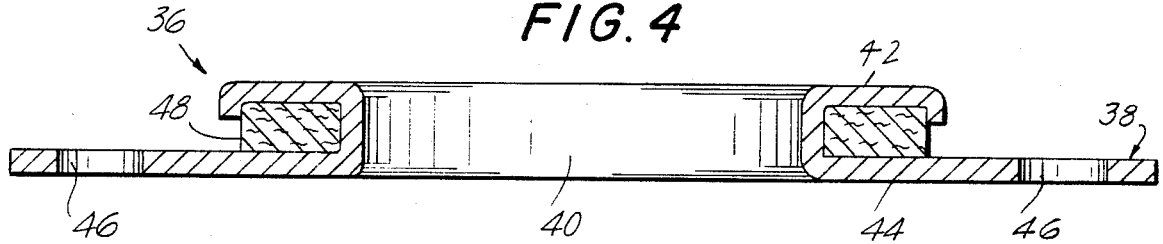
FIG. 4 is a sectional view of an alternate embodiment of the combination metal and knitted wire mesh gasket of the present invention.

Referring to FIG. 4 an alternate embodiment of the combination metal and knitted wire mesh gasket of the present invention is indicated generally by the reference numeral 36. Again, the specific dimensions given in connection with the combination gasket 36 are chosen for use of the gasket in an automotive exhaust system and can be changed as necessary in order to adjust the dimensions of the combination gasket. The gasket 36 incudes a gasket body 38 having a circular shaped opening 40 extending therethrough. The gasket body 38 is formed with interconnected first and second portions 42 and 44. Second portion 44 is formed with bolt receiving cut-outs 46. A ring of knitted wire mesh 48 is disposed between the first portion 42 and the second portion 44. As such, the first and second portions 42 and 44 form respective first and second gasket surfaces with the knitted wire mesh providing resiliency therebetween.

The gasket body 38 is formed of any suitable metal, such as stainless steel, and is approximately 0.001 to 0.010 inches thick. The knitted wire mesh ring 48 may be formed from stainless steel, and is compressed to a density of between 10 to 40%, and a thickness in the range of 1/16 to 3/16 of an inch. Of course, the thickness of the material forming the gasket body 38 and the density of the knitted wire mesh can be regulated for various degreees of compliance and resiliency.

Figure 6:
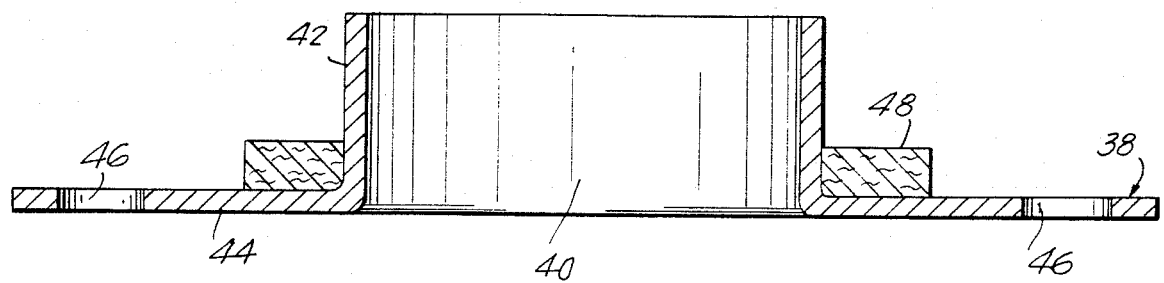

Referring now to FIGS. 5 and 6, the formation of the combination gasket 36 is shown. Initially, the first portion 42 of the gasket body 38 is perpendicular to the second portion 44 (FIG. 5). The knitted wire mesh ring 48 is then placed around the first portion 42 and against the second portion 44 (FIG. 6). The first portion 42 is then folded down against the top surface of the knitted wire mesh ring 48 (FIG. 4) to partially enclose the ring and form the first surface of the gasket 36.

It will be readily appreciated that the knitted wire mesh gives the combination gaskets of the present invention sustained resiliency. The metal gasket body holds the knitted wire mesh ring in position and provides an impervious barrier which prevents high temperature gases from coming in contact with the internal diameter of the knitted wire mesh ring. Specifically, when the combination gasket 10 is installed between two joint surfaces, as in an engine installation, the projecting first surface 22 of the knitted wire mesh ring 20 makes contact with its corresponding joint surface. As the joint bolts are tightened the first surface 22 of the ring 20 is compressed causing an opposing compressive force between the gasket 10 and the corresponding joint surfaces. As the joint bolts are tightened (or torqued) further, the uppermost surface of the first portion 16 of the gasket 10 (which was originally below the first surface 22 of the ring 20, makes contact with its corresponding joint surface. In addition, the knitted wire mesh below the first portion 16 maintains a sustained compressive force between it and the second portion 18 of the gasket 10 thereby forming a gas impervious barrier of metal between the joint surfaces.

Warpage or movement of the joint surfaces caused by temperature changes or by other mechanical disturbances are accomodated by the sustained resiliency and compliance of the combination metal and knitted wire mesh gasket structure of combination gaskets 10 and 36. Specifically, combination gasket 10 has been used with a four-cylinder automobile engine equipped with a lightweight stainless steel exhaust manifold. Flange movement due to thermal expansion is a common problem with this type of manifold thereby imposing severe performance requirements on the gasket clamped between it and the exhaust ports on the cylinder head of the engine. The combination gasket 10 provided the needed resiliency and structural integrity in this application and the gaskets were even capable of being reused on engines which were disassembled and then reassembled.

When the combination gaskets of the present invention are subjected to compression loading between two joint surfaces, the knitted wire mesh maintains a sustained spring like barrier between the two joint surfaces. Installed compression loadings from below 100 lb/sq in. to well in excess of 10,000 lb/sq in. can be used depending upon the operating conditions and the joint being sealed. Regardless of loading, the knitted wire mesh always exerts useful non-linear compression spring forces. For example, when using combination gasket 10 in an automotive application a minimal clamping load of 100 lbs/sq in. is more than adequate to achieve a 100% seal against an air pressure of 25 lb/sq in. The clamping stress on the upper most surface of the first portion 16 of the gasket body 12 and the first surface 22 of the knitted wire mesh ring 20 is approximately 300 lb/sq in. Clamping loads of several to many orders of magnitude could be used even in the low pressure application of automobile exhaust systems.

The knitted wire mesh also serves to diffuse leaks to prevent high velocity jets which cause further erosion and damage. For example, if for some reason gasket bodies 12 or 38 of respective gaskets 10 and 36 should become perforated, thereby breaking the gas impervious barrier, then some pressurized fluid or gas will enter the respective knitted wire mesh rings 20 and 48. In a low pressure system, such as an automobile exhaust system, gas will diffuse through the knitted wire mesh without causing high velocity jets or erosion failure which normally occurs upon the failure of conventional gasketing materials. If the leakage described continues, there would most likely be no underhood damage or other adverse effects becasue the leakage is in the form of a diffused seepage. Since the knitted wire mesh acts as a high pressure-drop filter medium, it will entrap any particulate matter tending to migrate through it, thereby reducing leakage. Upon discovery of any such leaks, a retorquing of the joint bolts would most often be sufficient to eliminate the problem. Further, since the combination gaskets 10 and 36 are completely metallic and formed of corrosion resistant alloys, virtually no damage is caused by leakage.

In addition to automotive applications the combination gaskets of the present invention are useful in industrial applications, such as for sealing valve bodies and flanged pipe joints. In any high pressure/high temperature application, the combination gaskets of the present invention can provide the necessary resiliency, mechanical compliance, corrosion resistance and structural integrity. The knitted wire mesh rings of the combination gaskets provide exceptionally high compressive strength, and inherent resiliency is retained at compressive stresses as high as 50,000 lb/sq in. Further, the knitted wire mesh provides excellent mechanical backup support for the sheet metal in the radial direction. This support is enhanced by the naturally high friction forces generated by the relatively rough surfaces of the knitted wire mesh rings. Blow out strength and leak resistance of the combination gasket may be regulated by varying the area of the knitted wire mesh.

The combination gaskets of the present invention may also be used in extremely low temperature applications, such as cryogenic technology. For example, combination gaskets formed of austinitic stainless steel would be useful in cryogenic applications, since austinitic stainless steels are known to increase in strength at cryogenic temperatures and are used universally in cryogenic process systems.

It will be readily appreciated that the combination gaskets described above can be formed into shapes other than an annular ring and, of course, can be used in applications other than those described above.

As will be readily apparent to those skilled in the art, the invention may be used in other specific forms or for other purposes without departing from its spirit or central characteristics. The present embodiment is therefore to be considered as illustrative and not restrictive, the scope of the invention being indicated by the claims rather than by the foregoing description, and all embodiments which come within the range of equivalence of the claims are intended to be embraced.

We claim:

1. A gasket comprising a gasket body formed of metal and having interconnected first and second portions and a layer of knitted wire mesh having a recess extending along the internal circumference of a first surface thereof and receiving the first portion of said metal gasket body and the second surface of said knitted wire mesh engaged with the second portion of said metal gasket body such that the first portion of said metal gasket body and knitted wire mesh form a first surface of said gasket and the second portion of the metal gasket body forms the second surface of said gasket.

2. A gasket as in claim 1 in which said gasket body is formed of stainless steel.

3. A gasket as in claim 2 in which said knitted wire mesh is formed of stainless steel.

4. A gasket comprising a gasket body formed of metal and having interconnected first and second portions, and a layer of knitted wire mesh disposed between said first and second portions of said metal gasket body, said first and second portion of said metal gasket body forming respective first and second surfaces of said gasket, and said knitted wire mesh providing resiliency therebetween.

5. A gasket as in claim 4 in which said gasket body is formed from stainless steel.

6. A gasket as in claim 5 in which said knitted wire mesh is formed from stainless steel.

* * * * *